(12) United States Patent
Morgan et al.

(10) Patent No.: US 8,097,107 B2
(45) Date of Patent: Jan. 17, 2012

(54) SINGLE STAGE GLASS LAMINATION APPARATUS AND PROCESS

(75) Inventors: Christopher Morgan, Strathfield (AU); Christine Foster, Pullenvale (AU)

(73) Assignee: Bond Brothers Contracting Pty Ltd., Toronto NSW (AU)

( * ) Notice: Subject to any disclaimer, the term of this patent is extended or adjusted under 35 U.S.C. 154(b) by 401 days.

(21) Appl. No.: 12/324,130

(22) Filed: Nov. 26, 2008

(65) Prior Publication Data

US 2009/0139634 A1 Jun. 4, 2009

(30) Foreign Application Priority Data

Nov. 30, 2007 (AU) ................................ 2007906540

(51) Int. Cl.
*B29C 65/00* (2006.01)
*B32B 17/00* (2006.01)
*B32B 37/00* (2006.01)
*C03C 27/00* (2006.01)

(52) U.S. Cl. .......... 156/106; 156/99; 156/295; 156/311; 156/312; 156/272.2; 156/379.6; 156/499

(58) Field of Classification Search .................. 156/106, 156/295, 311, 312, 272.2, 379.6, 499
See application file for complete search history.

(56) References Cited

U.S. PATENT DOCUMENTS

| | | | |
|---|---|---|---|
| 3,509,015 A | 4/1970 | Wismer et al. | |
| 4,125,669 A | 11/1978 | Triebel et al. | |
| 4,234,533 A | 11/1980 | Langlands | |
| 4,724,023 A | 2/1988 | Marriott | |
| 5,118,371 A | 6/1992 | Hori et al. | |
| 5,268,049 A | 12/1993 | Marriott et al. | |
| 7,063,760 B2 | 6/2006 | Sklyarevich et al. | |
| 2004/0182493 A1 | 9/2004 | Chick | |
| 2005/0103426 A1* | 5/2005 | Chick | 156/106 |
| 2007/0034317 A1 | 2/2007 | Sklyarevich | |

FOREIGN PATENT DOCUMENTS

GB 2236277 A 4/1991
WO 8803517 A 5/1988

* cited by examiner

*Primary Examiner* — Khanh P Nguyen
*Assistant Examiner* — Carson Gross
(74) *Attorney, Agent, or Firm* — Edell, Shapiro & Finnan, LLC

(57) ABSTRACT

A glass sheet assembly including a first glass sheet arranged in an opposing parallel configuration with respect to a second glass sheet is provided, with a heat sensitive layer of adhesive laminating film disposed between the first glass sheet and the second glass sheet, the glass sheet assembly having a leading edge and a trailing edge and being of a fixed length and width, the laminating film having a bonding temperature at which melting of the laminating film is initiated. The glass sheet assembly is heated using an array of heating elements so as to cause differential heating along the length of the glass sheet assembly such that the temperature at the leading edge of the glass sheet assembly is higher than the temperature at the trailing edge of the glass sheet assembly with uniform heating across the width of the glass sheet assembly. The first and second glass sheets are pressed toward each other to purge air or moisture from the glass sheet assembly until the first and second glass sheets adhere together via the adhesive laminating film, the step of pressing being initiated at the leading edge of the glass sheet assembly when the temperature of the laminating film at the leading edge of the glass sheet assembly reaches the bonding temperature of the laminating film.

16 Claims, 5 Drawing Sheets

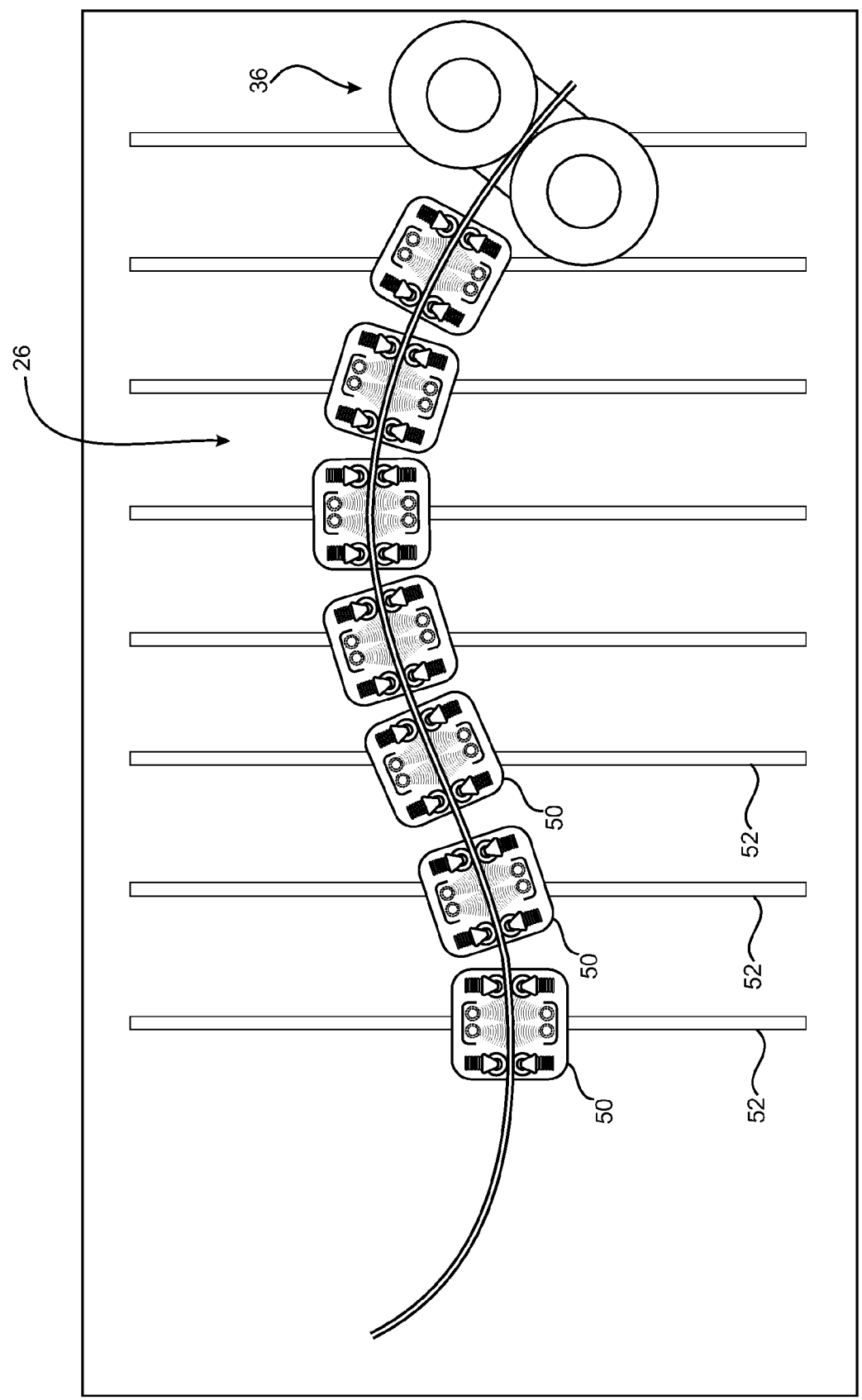

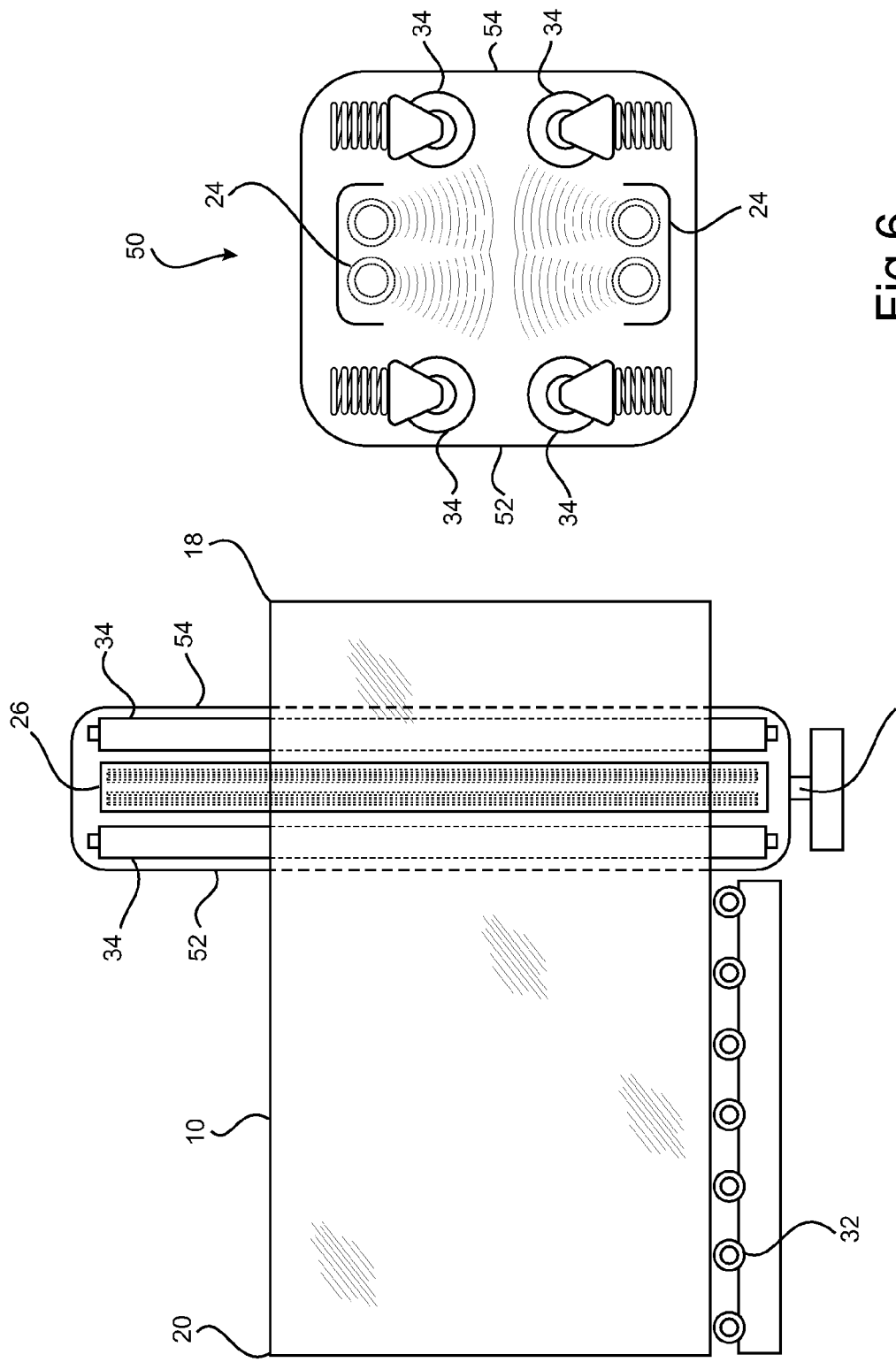

SINGLE STAGE GLASS LAMINATION APPARATUS AND PROCESS

FIELD OF THE INVENTION

The present invention relates to the lamination of glass using a single stage process. The present invention relates particularly, though not exclusively to an infra red heating process.

BACKGROUND TO THE INVENTION

Laminates provide a way of strengthening frangible material, for example glass, so as to extend its uses and to render it safer to use in certain circumstances. Laminated glass products can be used for automotive and aircraft glazing, glass doors, balustrades, bulletproofing and many other uses where the glass product must be strong and/or shatterproof. A number of methods for producing such laminates have been disclosed (see, for example, U.S. Pat. Nos. 5,268,049; 5,118,371; 4,724,023; 4,234,533; and 4,125,669). Conventionally, laminated glass is produced by forming a glass sheet assembly or stack which is made up of at least two flat sheets of glass with a layer of polymer adhesive laminating film sandwiched between adjacent sheets. In the event that the laminated glass is caused to break or crack in use, the function of the polymer adhesive laminating film is to hold the broken pieces of glass together. Bonding between the laminating film and the glass sheets is traditionally achieved using a combination of evacuation, pressing and heating.

The main problem encountered in the production of laminated glass is that air and/or moisture becomes trapped between the laminating film and the glass surfaces which can cause bubbling of the laminating film which is considered a defect which can render the glass unacceptable for use. Using prior art processes, the air is removed by diffusion or by dissolving in the film. Both processes are very slow, requiring long term post-lamination heating and/or the application of a high pressure cycle after lamination. The bigger the glass sheet, the longer the time that is required for removal of air from laminated glass. As a result, the productivity of such prior art processes is low and they require considerable capital expenditure for the necessary costly apparatus such as autoclaves.

Several prior art patents are directed to methods of laminating glass which are focused on allowing the air to escape during lamination. In U.S. Pat. No. 5,268,049, the glass sheets are spaced apart, and in the method described by U.S. Pat. No. 5,268,049, a liquid resin is used. In U.S. Pat. No. 4,234,533 the two sheets are held at an angle and in U.S. Pat. No. 5,118,371 the thickness of the laminating film gradually increases (or decreases) from the one side to the other side of the glass sheets. In U.S. Pat. No. 3,509,015, a method is described for producing laminated glass by sealing the periphery of two parallel glass sheets with pressure sensitive tape and forcing resinous material under pressure into the inter-sheet space. The resinous material is forced through a self-closing valve held in place with the tape while trapped air escapes through an aperture in the taped seam at the top of the cell. U.S. Pat. No. 4,125,669 describes a similar method in which two glass panes are sealed all around except for a filling opening and an aeration opening, and a binder material is introduced into the envelope thus formed in an amount calculated to exactly fill the envelope. Putty is applied to the openings just before emergence of the binder upon laying the filled envelope flat. In U.S. Pat. No. 7,063,760, the laminating film is applied to the first sheet of glass and then heated with microwave radiation to a bonding temperature and heated areas of the film are successively pressed to the glass sheet in a continuous manner to purge air from between the film and the first glass sheet. The pressed film areas are then cooled and subjected to a partial vacuum before a second glass sheet is positioned on the film. The film is then reheated with microwave radiation to a bonding temperature and thereafter cooled whereby an appropriate bond is obtained between the film and the second glass sheet to provide a glass lamination.

These solutions still require multi-pass operation, high energy consumption and, often, expensive equipment such as high pressure autoclaves which allow limited flexibility in their adaptation for use on various types of glass. Accordingly, there is a need in the art for a more flexible and less expensive method for laminating glass sheets which reduces energy consumption.

SUMMARY OF THE INVENTION

According to one aspect of the present invention there is provided a method of laminating glass sheets, the method comprising the steps of:
(a) providing a glass sheet assembly comprising a first glass sheet arranged in an opposing parallel configuration with respect to a second glass sheet, with a heat sensitive layer of adhesive laminating film disposed between the first glass sheet and the second glass sheet, the glass sheet assembly having a leading edge and a trailing edge and being of a fixed length and width, the laminating film having a bonding temperature at which melting of the laminating film is initiated;
(b) heating the glass sheet assembly using an array of heating elements so as to cause differential heating along the length of the glass sheet assembly such that the temperature at the leading edge of the glass sheet assembly is higher than the temperature at the trailing edge of the glass sheet assembly with uniform heating across the width of the glass sheet assembly; and,
(c) pressing the first and second glass sheets toward each other to purge air or moisture from the glass sheet assembly until the first and second glass sheets adhere together via the adhesive laminating film, the step of pressing being initiated at the leading edge of the glass sheet assembly when the temperature of the laminating film at the leading edge of the glass sheet assembly reaches the bonding temperature of the laminating film.

In one form, step (c) is conducted using a pressing station and the glass sheet assembly is conveyed to the pressing station using a conveying system. The array of heating elements may include a plurality of elongated heating elements arranged across the breadth of the oven in spaced-apart rows to provide even heating across the width of the heating chamber.

In one form, each of the heating elements in the array has a fixed pre-determined heating output and is capable of being switched between a dormant cycle during which the heating element is switched off, and a heating duty cycle during which the heating element is switched on. Uniform heating across the width of the glass sheet assembly in step (b) may be achieved by switching each of the heating elements in a given row within the array on to its heating duty cycle at the same time, for the same frequency and for the same duration. Differential heating along the length of the glass sheet assembly in step (b) may be achieved by varying the frequency and duration of the heating duty cycles of the heating elements along the length of the heating chamber such that a heating element which is closer to the leading edge of the glass sheet assembly is switched on for a longer period of time than a heating element closer to the trailing edge of the glass sheet assembly. The frequency and duration of the heating duty cycle of the heating elements may increase uniformly along the length of the oven, reaching peak duration and frequency immediately prior to the pressing station, so that the temperature of the laminating film at the leading edge of the glass sheet assembly reaches bonding temperature immediately prior to the pressing station.

In another form, differential heating along the length of the glass sheet assembly in step (b) is achieved by varying the predetermined maximum heating output of the heating elements along the length of the heating chamber, whereby a heating element in a row closer to the leading edge of the glass sheet assembly has a higher predetermined maximum heating output than a heating element in a row closer to the trailing edge of the glass sheet assembly. The frequency and duration of the heating duty cycle of the heating elements may be constant while the heating output increases uniformly along the length of the oven, reaching a peak heating output so that the temperature of the laminating film at the leading edge of the glass sheet assembly reaches bonding temperature immediately prior to the pressing station.

In one form, the conveying system comprises a plurality of supporting rollers to control the movement of the glass sheet assembly relative to the array of heating elements towards a pressing station. Advantageously, the speed of travel of the glass sheet assembly relative to the array of heating elements is adjustable by adjusting the speed of the supporting rollers of the conveying system. Preferably, the plurality of supporting rollers of the conveying system are evenly spaced across the width and breadth of the oven and offset relative to the array of heating elements. The relative distance between the glass sheet assembly and the array of heating elements may be adjustable to accommodate glass sheet assemblies of different thicknesses.

In one form, the first and second glass sheets are correspondingly curved and the heating elements are coupled with the supporting rollers of the conveying system to form an assembly. The assembly may comprise two pairs of opposed supporting rollers and a pair of opposed heating elements with one pair of opposed supporting rollers arranged at the inlet of the assembly and the other pair of opposed supporting rollers being arranged at the outlet of the assembly, the pair of opposed heating elements being arranged therebetween. The assembly may be slidably mounted on a guide rail and constrained to move along the guide rail to follow the curve of the glass sheet assembly as it moves through the heating chamber towards the pressing station. In one form, each guide rail is arranged across the width of the heating chamber.

For greatest ease of control, the heating elements may be low frequency, medium frequency, or high frequency infrared emitters.

According to a second aspect of the present invention there is provided an apparatus for laminating a glass sheet assembly, the glass sheet assembly comprising a first glass sheet arranged in an opposing parallel configuration with respect to a second glass sheet, with a heat sensitive layer of adhesive laminating film disposed between the first glass sheet and the second glass sheet, the glass sheet assembly having a leading edge and a trailing edge and being of a fixed length and width, the laminating film having a bonding temperature at which melting of the laminating film is initiated, the apparatus comprising:

a heating chamber for heating the glass sheet assembly, the heating chamber comprising an array of heating elements for causing differential heating along the length of the glass sheet assembly such that the temperature at the leading edge of the glass sheet assembly is higher than the temperature at the trailing edge of the glass sheet assembly with uniform heating across the width of the glass sheet assembly; and, a pressing station for pressing the first and second glass sheets toward each other to purge air or moisture from the glass sheet assembly until the first and second glass sheets adhere together via the adhesive laminating film, the step of pressing being initiated at the leading edge of the glass sheet assembly when the temperature of the laminating film at the leading edge of the glass sheet assembly reaches the bonding temperature of the laminating film.

In one form, the apparatus further comprises a conveying system for conveying the glass sheet assembly through the heating chamber to the pressing station.

In one form, the array of heating elements includes a plurality of elongated heating elements arranged across the breadth of the oven in spaced-apart rows. Each of the heating elements in the array may have a fixed pre-determined heating output and is capable of being switched between a dormant cycle during which the heating element is switched off, and a heating duty cycle during which the heating element is switched on. Uniform heating across the width of the glass sheet assembly may be achieved by switching each of the heating elements in a given row within the array on to its heating duty cycle at the same time, for the same frequency and for the same duration. Differential heating along the length of the glass sheet assembly may be achieved by varying the frequency and duration of the heating duty cycles of the heating elements along the length of the heating chamber such that a heating element which is closer to the leading edge of the glass sheet assembly is switched on for a longer period of time than a heating element closer to the trailing edge of the glass sheet assembly. The frequency and duration of the heating duty cycle of the heating elements may increase uniformly along the length of the oven, reaching peak duration and frequency immediately prior to the pressing station, so that the temperature of the laminating film at the leading edge of the glass sheet assembly reaches bonding temperature immediately prior to the pressing station.

In one form, differential heating along the length of the glass sheet assembly may bee achieved by varying the predetermined maximum heating output of the heating elements along the length of the heating chamber, whereby a heating element in a row closer to the leading edge of the glass sheet assembly has a higher predetermined maximum heating output than a heating element in a row closer to the trailing edge of the glass sheet assembly. The frequency and duration of the heating duty cycle of the heating elements may be constant while the heating output increases uniformly along the length of the oven, reaching a peak heating output so that the temperature of the laminating film at the leading edge of the glass sheet assembly reaches bonding temperature immediately prior to the pressing station.

In one form the conveying system may comprise a plurality of supporting rollers to control the movement of the glass sheet assembly relative to the array of heating elements towards a pressing station. The speed of travel of the glass sheet assembly relative to the array of heating elements may be adjustable by adjusting the speed of the supporting rollers of the conveying system.

In one form, the plurality of supporting rollers of the conveying system may be evenly spaced across the width and breadth of the oven and offset relative to the array of heating elements. The relative distance between the glass sheet assembly and the array of heating elements may be adjustable.

In one form, wherein the first and second glass sheets are correspondingly curved, the heating elements may be coupled with the supporting rollers of the conveying system to form an assembly. The assembly may comprise two pairs of opposed supporting rollers and a pair of opposed heating elements with one pair of opposed supporting rollers arranged at the inlet of the assembly and the other pair of opposed supporting rollers being arranged at the outlet of the assembly, the pair of opposed heating elements being arranged therebetween. The assembly may be slidably mounted on a guide rail and constrained to move along the guide rail to follow the curve of the glass sheet assembly as it moves through the heating chamber towards the pressing station. Each guide rail may be arranged across the width of the heating chamber.

Preferably, the heating elements are low frequency, medium frequency, or high frequency infrared emitters.

According to a third aspect of the present invention there is provided a method of laminating glass substantially as herein described with reference to and as illustrated in the accompanying illustrations.

According to a fourth aspect of the present invention there is provided an apparatus for laminating glass substantially as herein described with reference to and as illustrated in the accompanying illustrations.

BRIEF DESCRIPTION OF THE DRAWINGS

In order to facilitate a more detailed understanding of the nature of the invention several embodiments of the present invention will now be described in detail, by way of example only, with reference to the accompanying drawings, in which:

FIG. 4 illustrates a top view of a heating chamber for use in laminating curved glass;

FIG. 5 illustrates a side view of the heating chamber of FIG. 4; and,

FIG. 6 illustrates a combined heating element and supporting roller unit for use in the heating chamber of FIG. 4 or 5.

DETAILED DESCRIPTION OF PREFERRED EMBODIMENTS

Figure 1:
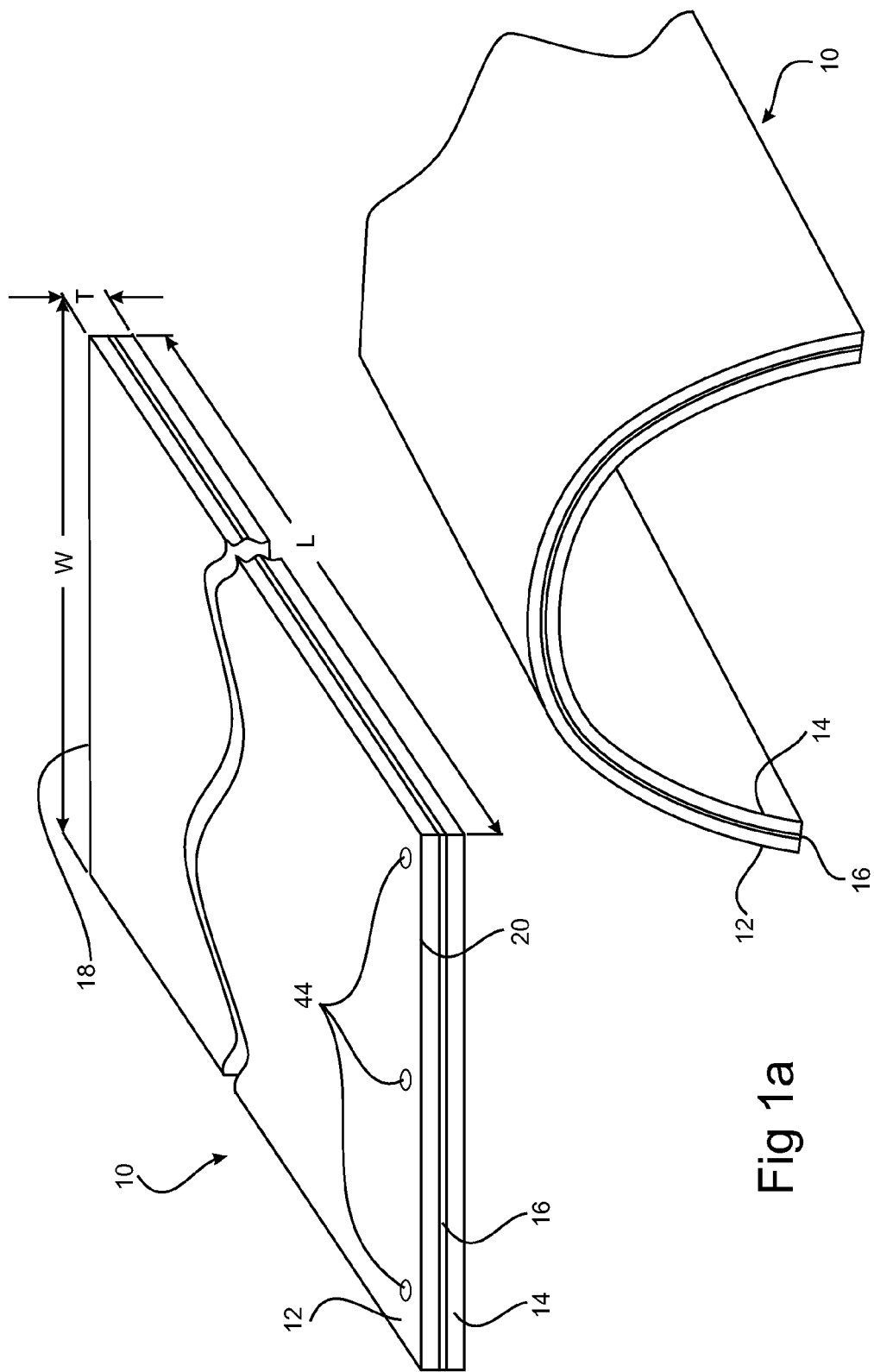
FIG. 1a illustrates a flat glass sheet assembly.
FIG. 1b illustrates a curved glass sheet assembly.

Particular embodiments of the method and apparatus for laminating glass sheets are now described, with particular reference to the lamination of two glass sheets to each other using a single laminating film sandwiched between the two sheets, by way of example only. The present invention is equally applicable to the lamination of a glass sheet assembly comprising three or more sheets, with laminating film being provided between adjacent sheets. The method can be utilized for Toughened Glass, Clear or coloured laminated glass as well as other PVB or EVA interlayer niche types of applications. The terminology used herein is for the purpose of describing particular embodiments only, and is not intended to limit the scope of the present invention. Unless defined otherwise, all technical and scientific terms used herein have the same meanings as commonly understood by one of ordinary skill in the art to which this invention belongs. In the drawings, it should be understood that like reference numbers refer to like members.

Throughout this specification the term "lamination" refers to a form of construction in which a thin layer of material is placed upon another thin layer in sequence and bonded together to form a structure. The term "laminated glass" used herein means two glass sheets with an intermediate film sandwiched therebetween which are temporarily or finally bonded together under pressure.

The acronym "PVB" refers to polyvinyl butyral. The acronym "EVA" refers to Ethylene Vinyl Acetate.

Figure 2:
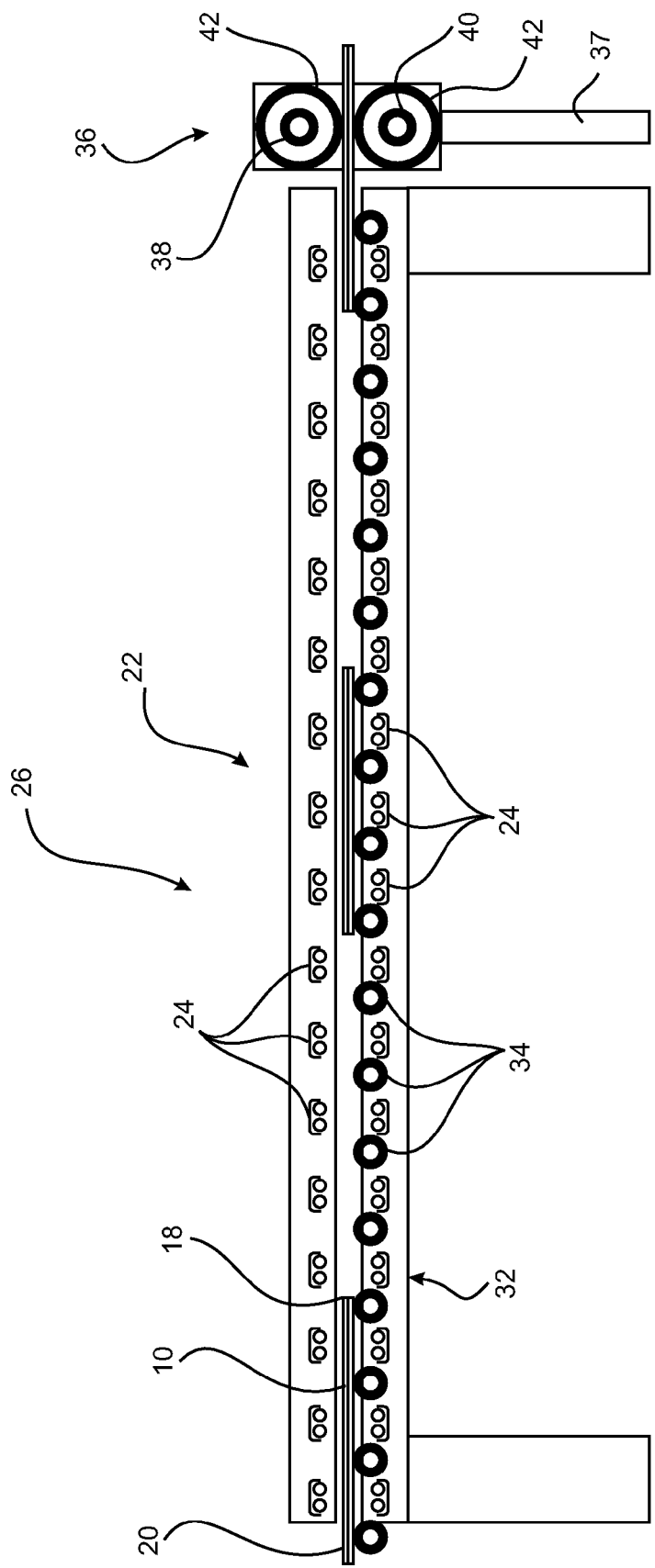
FIG. 2 is a side cross-sectional view of a flat glass laminating oven illustrating how the rollers and heating elements are offset from one another.
Figure 3:
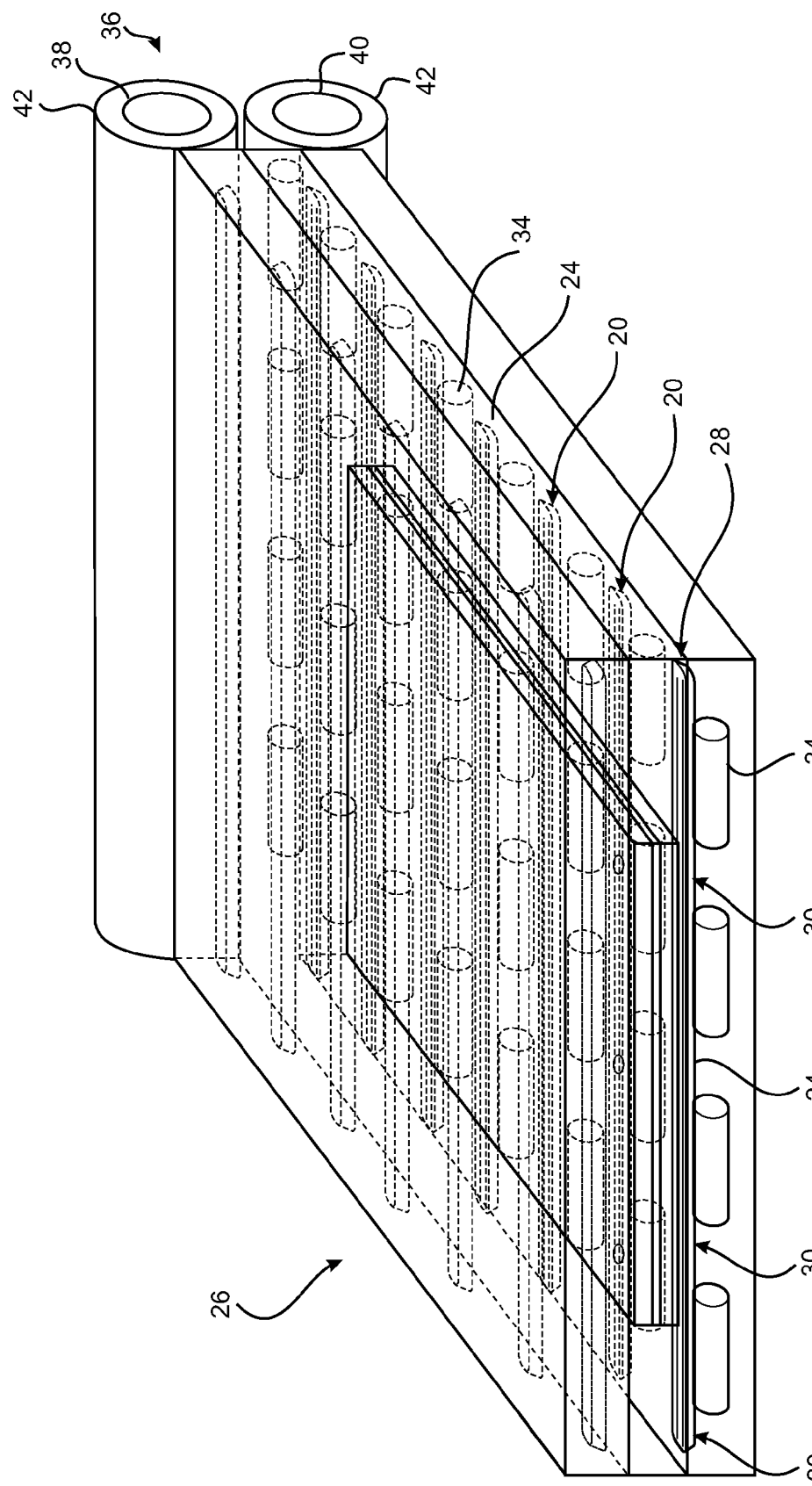
FIG. 3 is a partial isometric view of the oven of FIG. 2 illustrating the array of heating elements in rows and columns.

A first embodiment of a method of laminating glass sheets according to the present invention is illustrated schematically in FIGS. 1 to 3. As a first step, a glass sheet assembly is provided, generally indicated using reference numeral 10. The glass sheet assembly 10 has a first glass sheet 12 arranged in an opposing parallel, spaced-apart configuration with respect to a second glass sheet 14, with a heat sensitive layer of adhesive laminating film 16 disposed between the first and second glass sheets, 12 and 14 respectively. In the embodiment illustrated in FIG. 1a, the first and second glass sheets 12 and 14, respectively are flat. However the present invention is equally applicable to the lamination of sheets of glass having one or more arcuate portions when viewed in axial cross-section. By way of example, the glass sheet assembly 10 illustrated in FIG. 1b, for which like reference numerals refer to like parts, is curved.

The glass sheet assembly 10 has a leading edge 18, a trailing edge 20 and a fixed length, designated by the letter "L" in FIG. 1a. The width of the glass sheet assembly 10 is designated by the letter "W" in FIG. 1a. The thickness of the glass sheet assembly 10 is designated by the letter "T" in FIG. 1a.

The laminating film 16 has a bonding temperature at which melting of the laminating film is initiated, and the value of the bonding temperature for a given type and thickness of laminating film would be known to a person skilled in the art. By way of example, a PVB laminating film which is 0.38 to 1.52 mm thick has a bonding temperature in the range of 74-78 degrees Celsius. Melting of the heat-sensitive laminating film 16 is initiated by heating the glass sheet assembly 10 using an array 22 of spaced-apart heating elements 24, preferably infra-red heating elements, so as to cause differential heating along the length "L" of the glass sheet assembly 10 such that the temperature at the leading edge 18 of the glass sheet assembly 10 is higher than the temperature at the trailing edge 20, with uniform heating across the width "W" of the glass sheet assembly 10.

To achieve lamination after heating, the first and second glass sheets 12 and 14, respectively are pressed toward each other to purge air or moisture from the glass sheet assembly 10 until the first and second glass sheets adhere together via the melted layer of adhesive laminating film 16. The step of pressing is initiated when the temperature at the leading edge 18 of the glass sheet assembly 10 reaches the bonding temperature of the layer of laminating film 16. In this way, any air or moisture which is trapped between the laminating film 16 and the first sheet 12 or between the laminating film 16 and the second sheet 14 is able to be dispelled from the as yet un-pressed portion of the glass sheet assembly 10, leading to improved glass quality and consistency. Premature edge sealing is a problem in that this phenomenon makes it difficult or impossible to remove the excess air or moisture trapped between the top and bottom glass sheets during pressing. Using the process and apparatus of the present invention, differential heating along the length "L" of the glass sheet assembly 10 is used to alleviate the problem of premature edge sealing which occurs when the entire glass sheet assembly is heated uniformly across it full width and length when using prior art processes.

With reference to FIGS. 2 and 3, the array 22 of heating elements 24 is arranged within a heating chamber 26, for example an oven. The array 22 of heating elements 24 includes a plurality of elongated heating elements 24 arranged across the breadth of the oven 26 in spaced-apart rows 28. To maximize the effective size of the heating chamber 26, the length of each heating element 24 is selected to correspond substantially with the breadth of the oven 26). In the example illustrated in FIG. 3, the oven 26 is provided with seven elongated heating elements 24 arranged in an even spaced apart relationship within the oven 26. It is understood that this number of heating elements 24 can vary depending on such relevant factors as the maximum heating output of each heating element, the bonding temperature to be achieved and the width, length and thickness of the glass sheet assembly being heated in the oven. Using the process and apparatus of the present invention, the heating output of each of the heating elements 24 is controllable and monitored to target uniform heating of the layer of laminating film 16 across the full width "W" of the glass sheet assembly 10, as well as differential heating along the length "L" of the glass sheet assembly 10 such that the temperature at the leading edge 18 is at all times higher than the temperature at the trailing edge 20.

With reference to FIG. 2, a conveying system 32 including a plurality of supporting rollers 34 is used to load each glass sheet assembly 10 into the oven 26 and to control the movement of the glass sheet assembly 10 past the array 22 of heating elements 24 towards a pressing station 36, for example a calendar press comprising a pair of spaced apart members supporting a frame 37 upon which is mounted a plurality of drive units 38 rotating in a counter-clockwise direction and a plurality of free-roll units 40 which rotate in use in a clockwise direction. The relative distance between the plurality of drive units 38 and the plurality of free-roll units 40 is adjustable to accommodate the different thickness of a given glass sheet assembly 10 and the degree of pressing required to achieve lamination. Each of the drive units 38 and free-roll units 40 includes one or more pressing rollers 42 which press against the exterior surfaces of the first and second sheets of glass, 12 and 14 respectively, in use. The pressing rollers 42 may be heated if desired to minimise any change in temperature of the glass sheet assembly 10 during pressing. The pressing station 36 can be located inside the oven 26, but is preferably outside of the oven for ease of operation and maintenance.

The speed of travel of the glass sheet assembly 10 through the oven 26 is adjustable by adjusting the speed of the supporting rollers 34 of the conveying system 32. The specific speed of travel will depend on a number of relevant factors including, the length of the oven, the type of glass, the thickness of each sheet of glass, the bonding temperature of the laminating film, and the maximum heat output of each of the heating elements. By way of example, the conveying system speed can be set at approximately 1 m/min from loading of the glass sheet assembly to completion of the lamination process. One of the key functions of the conveying system 32 is ensuring that the heated glass sheet assembly 10 is presented to the pressing station 36 in a continuous controlled manner to optimize the air removal process. For best results, the plurality of supporting rollers 34 of the conveying system 32 are evenly spaced across the width and breadth of the oven 26 and offset relative to the array 22 of heating elements 24 so as interfere as little as possible with the flow of heat or radiation from the heating elements 24 towards the glass sheet assembly 10.

Using the process and apparatus of the present invention, the heating output of each of the heating elements 24 in the array 22 is heat profile mapped to ensure a gradual application of energy over the full length "L" of the glass sheet assembly as it is conveyed through the oven, with uniform heating across the width "W". Heat profile mapping is monitored using a plurality of temperature sensors 44 arranged within the oven or within the glass sheet assembly. By way of example, three temperature sensors 44 are placed between the first sheet 12 and the layer of laminating film 16 at the trailing edge 20 of the glass sheet assembly 10 illustrated in FIG. 1a. Each of the three temperature sensors 44 are evenly spaced apart from one another across the width "W" of the glass sheet assembly 10 with the signal generated by each of the three temperature sensors 44 being monitored to confirm that the glass sheet assembly 10 is being heated uniformly across its width "W". If desired, the signal generated by each temperature sensor 44 can be used in a feedback loop to automatically adjust the heating output of one or more of the heating elements 24 in the array 22 to improve the degree of uniformity of heating across the width "W" of each glass sheet assembly 10.

In one embodiment of the present invention, each of the heating elements 24 in the array 22 has a fixed pre-determined heating output and is capable of being switched between a dormant cycle during which the heating element 24 is switched off, and a heating duty cycle during which the heating element 24 is switched on. Using this type of array 22 of heating elements 24, uniform heating across the width "W" of the glass sheet assembly 10 is achieved in one embodiment by ensuring that each of the heating elements 24 in a given row 28 within the array 22 is switched on to its heating duty cycle at the same time, for the same frequency and for the same duration. Differential heating along the length "L" of the glass sheet assembly 10 is achieved in this embodiment, by varying the frequency and duration of the heating duty cycles of the heating elements 24 along each column 30 in the array 22 whereby a heating element 24 which is closer to the leading edge 18 of the glass sheet assembly 10 is switched on for a longer period of time than a heating element 24 closer to the trailing edge 20 of the glass sheet assembly 10. In this embodiment, the frequency and duration of the heating duty cycle of the heating elements within the heating chamber 26 increases uniformly along the length of the heating chamber 26, reaching peak duration and frequency immediately prior to the pressing station 36, so that the temperature of the laminating film 16 at the leading edge 18 of the glass sheet assembly 10 reaches bonding temperature immediately prior to the pressing station 36. In use, the frequency and duration of the heating duty cycles of each of the heating elements 24 in the array 22 are pre-programmed as a function of a number of relevant variables including the thickness of each of the top and bottom glass sheet, the bonding temperature of the adhesive laminating film, and the fixed length of each glass sheet assembly.

In another embodiment of the present invention, uniform heating across the width "W" of the glass sheet assembly 10 is achieved by ensuring that each of the heating elements in a given row 28 within the array 22 is switched on to its heating duty cycle at the same frequency and for the same duration in an analogous manner to the previous embodiment. Differential heating along the length "L" of the glass sheet assembly 10 is achieved in this embodiment by varying the predetermined maximum heating output of the heating elements 24 in each row 28 in the array 22 whereby the heating element 24 in a row 28 closer to the leading edge 18 of the glass sheet assembly 10 will have a higher predetermined maximum heating output than a heating element 24 in a rows 28 closer to the trailing edge 20 of the glass sheet assembly 10. In this embodiment, the frequency and duration of the heating duty cycle of the heating elements can be held constant while the heating output increases uniformly along the length of the oven 26, reaching a peak heating output so that the temperature of the laminating film 16 at the leading edge 18 of the glass sheet assembly 10 reaches bonding temperature immediately prior to the pressing station 36.

In the preferred embodiments of the present invention, the heating elements 24 rely on the use of infrared radiation, which can be short wave (within the range of 1.4-3 μm in wavelength), medium wave (within the range of 3-8 μm in wavelength) or long wave (within the range of 8-15 μm). It is equally possible to use "near IR" which has a wavelength in the range of 0.75-1.4 μm. Using infrared radiation with shorter wavelengths (higher frequency) reduces heating and reheating time and increases efficiency of the process.

Infrared heating is preferred as it allows heating to be achieved almost instantaneously and in a controllable and targeted fashion. When infrared radiation is used for the heating elements 24, the wavelength of the applied infrared radiation is an important parameter that must be programmed for each type and thicknesses, both of the laminating film 16 and the first and second glass sheets, 12 and 14 respectively. The particular frequency chosen should ensure maximum selectivity of direct heating of the laminating film 16 through the thickness of each of the first and second glass sheets, 12 and 14 respectively. When infrared radiation is applied to the glass sheet assembly 10, the infrared radiation passes through the first or second glass sheets and heats the laminating film 16 sandwiched between them, with consequential heating of the first and second glass sheets themselves. The portion of the energy that is absorbed by the laminating film 16 and by the first and second glass sheets 12 and 14 respectively, depends on the infrared frequency, absorption properties of the laminating film and the first and second glass sheets and their thicknesses. The heating time depends on the power density of infrared radiation, with a more rapid increase in temperature of the laminating film being achieved with an infrared heating element having a higher power density. Faster heating rates allow for the use of a faster conveying speed for the conveying system 32 and therefore increased productivity.

For maximum flexibility of operation, the relative distance between the glass sheet assembly 10 and the array 22 of heating elements 24 is adjustable. This can either be achieved by moving the array of heating elements 24 closer or further away from the glass sheet assembly 10 whilst the supporting rollers 34 of the conveying system 32 remain fixed, or by adjusting the position of the supporting rollers 34 of the conveying system 32 relative to the position of the heating elements 24 while the array 22 of heating elements 24 remains fixed.

The advantages of the various aspects and embodiments of the present invention are further described and illustrated by the following examples and experimental test results. These examples and experimental test results are illustrative of a variety of possible implementations and are not to be construed as limiting the invention in any way.

EXAMPLE

A single heated zone of 5 m in length and 2.6 m wide, containing an array of 20×5500 watt heating elements in the form of medium wave infrared emitters with gold reflectors arranged to reflect heat towards the glass sheet assembly. The array of heating elements is positioned approximately 100 mm from the exterior faces of the first and second glass sheets. The infrared emitters are evenly spaced across the width and breadth of the oven so that the oven has a heating zone of 2500 mm in length. All measurements of temperature of the glass sheet assembly were recorded using thermocouples placed in between the first glass sheet and the layer of laminating film, approximately 200 mm in from the trailing edge of the glass sheet assembly (one being placed at the centre, one 200 mm in from the left hand side and one 200 mm in from the right hand side). The heat output from the infrared emitters is controlled using three infrared pyrometers—one of the infrared pyrometers is used for control purposes, with the other two being used for reference purposes to confirm even heating across the width of the oven is being achieved. In this example, the heating output of the infrared pyrometers is controlled to ensure that the layer of laminating film is heated to its bonding temperature (which is in the range of 74° C.-78° C.) as the leading edge of the glass sheet assembly reaches the calendar press. The pressing rollers of the calendar press are set at 0.4 mm less than the package thickness with 600 kpa downward pressure being applied to de-air the glass sheet assembly during lamination, leaving the package bonded without any visible inclusions of either air or moisture.

FIGS. 4, 5 and 6 for which like reference numerals refer to like parts, illustrate how the process and apparatus of the present invention can be adapted to the lamination of curved glass sheet assemblies. As best seen in FIG. 6, the heating elements 24 are coupled with the supporting rollers 34 of the conveying system 32 to form an assembly generally designated using reference numeral 50. Each assembly 50 is slidably mounted on a guide rail 52 and constrained to move along the guide rail to follow the curve of the glass sheet assembly 10 as it moves through the heating chamber 26 towards the pressing station 36. Each guide rail is arranged across the width of the heating chamber such that each of the guide rails 52 is essentially equivalent to one of the plurality of rows 28 of heating elements 24 in the array 22.

Within each assembly 50, there is provided a two pairs of opposed supporting rollers 34 and a pair of opposed heating elements 24. One pair of opposed supporting rollers 34 is arranged at the inlet 52 of the assembly 50 with the other pair of opposed supporting rollers 34 being arranged at the outlet 54 of the assembly 50, with the pair of opposed heating elements 24 being arranged therebetween. For maximum flexibility of operation, the relative distance between the glass sheet assembly 10 and the pair of opposed heating elements 24 is adjustable. In use, the curved glass sheet assembly 10 is fed into the inlet 52 of an assembly 50 with each pair of opposed supporting rollers 34 being used to centre the glass sheet assembly 10 and guide its passage through the assembly 50 whilst applying sufficient pressure to maintain contact between the first and second sheets 12 and 14 and the laminating film 16. As the glass sheet assembly 10 passes through the assembly 50, one of the heating elements 24 emits infrared radiation through the first sheet 12 towards the laminating film 16 whilst the other opposed heating element 24 emits infrared radiation through the second sheet 14 towards the laminating film 16.

In this embodiment, the heating output of each of the heating elements 24 in the array 22 is controlled in the manner described above to effect differential heating along the length of the heating chamber 26 and along the length "L" of the glass sheet assembly 10 in use. The heating elements 24 in the assemblies 50 closest to the leading edge 18 of the glass sheet assembly 10 have a higher predetermined maximum heating output than the heating elements 24 in the assemblies 50 closest to the trailing edge 20 of the glass sheet assembly 10. In this embodiment, the heating output of the heating elements 24 in each assembly is controlled so that the temperature of the laminating film 16 at the leading edge 18 of the glass sheet assembly 10 reaches bonding temperature immediately prior to the pressing station 36.

Now that the preferred embodiments of the present invention have been described in detail, the present invention has a number of advantages over the prior art, including the following:

a) the energy costs associated with the process are minimized because the heating elements are only switched from their dormant cycle to their heating duty cycle on an as-needs basis, as the glass sheet assembly travels along the length of the oven (compared with prior art processes in which a whole heating chamber has to be heated or cooled);

b) the heating chamber can be modularized to allow for expansion, with additional units set alongside each other to maximize the utilization of available space;

c) the apparatus of the present invention requires less capital cost outlay compared with prior art equipment due to the high costs associated with autoclaves;

d) the apparatus of the present invention has a more compact footprint compared with prior art ovens;

e) the apparatus of the present invention has lower power requirements than prior art equipment;

f) the apparatus of the present invention has greater flexibility than prior art process through use of the variable power infrared emitters which allow the oven to be used for the lamination of different types and sizes of glass with ease;

g) the gradual increase in infrared radiation experienced by the glass sheet assembly as it is conveyed through the heating chamber results not only in improved bonding between the laminating film and the first and second sheets, but also a reduction in edge seal failure, allowing moisture and air to be purged from the glass sheet assembly during pressing. The gradual increase in infrared radiation thus results in bonding between the laminating film and the first and second sheets occurring at the nominated bonding temperature immediately prior to pressing without the need to use the multiple stages and reheating autoclaves of the prior art; and, g) there is no need to apply high pressure and long heating for dissolving air, as in the current technologies.

Now that several embodiments of the invention have been described in detail, it will be apparent to persons skilled in the relevant art that numerous variations and modifications can be made without departing from the basic inventive concepts. For example, it is equally possible for the glass sheet assembly to remain stationary whilst the array of heating elements are caused to move relative to the glass sheet assembly, although such an arrangement is less practical and therefore less economical than the use of a conveying system arranged to cause the glass sheet assembly to move relative to a fixed array of heating elements. All such modifications and variations are considered to be within the scope of the present invention, the nature of which is to be determined from the foregoing description and the appended claims.

All of the patents cited in this specification, are herein incorporated by reference. In the summary of the invention, the description and claims which follow, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

What is claimed:

1. A method of laminating glass sheets, the method comprising the steps of:

(a) providing a glass sheet assembly comprising a first glass sheet arranged in an opposing parallel configuration with respect to a second glass sheet, with a heat sensitive layer of adhesive laminating film disposed between the first glass sheet and the second glass sheet, the glass sheet assembly having a leading edge and a trailing edge and being of a fixed length and width, the laminating film having a bonding temperature at which melting of the laminating film is initiated;

(b) heating the glass sheet assembly using an array of heating elements so as to cause differential heating along the length of the glass sheet assembly such that the temperature at the leading edge of the glass sheet assembly is higher than the temperature at the trailing edge of the glass sheet assembly with uniform heating across the width of the glass sheet assembly, wherein each of the heating elements in the array has a fixed pre-determined heating output and is capable of being switched between a dormant cycle during which the heating element is switched off, and a heating duty cycle during which the heating element is switched on, and differential heating along the length of the glass sheet assembly is achieved by varying the frequency and duration of the heating duty cycles of the heating elements along a length of a heating chamber in which the glass sheet assembly is heated such that a heating element which is closer to the leading edge of the glass sheet assembly is switched on for a longer period of time than a heating element closer to the trailing edge of the glass sheet assembly; and, (c) pressing the first and second glass sheets toward each other to purge air or moisture from the glass sheet assembly until the first and second glass sheets adhere together via the adhesive laminating film, the step of pressing being initiated at the leading edge of the glass sheet assembly when the temperature of the laminating film at the leading edge of the glass sheet assembly reaches the bonding temperature of the laminating film.

2. The method of claim 1, wherein step (c) is conducted using a pressing station and the glass sheet assembly is conveyed to the pressing station using a conveying system.

3. The method of claim 1, wherein the array of heating elements includes a plurality of elongated heating elements arranged across the breadth of the oven in spaced-apart rows.

4. The method of claim 1, wherein uniform heating across the width of the glass sheet assembly in step (b) is achieved by switching each of the heating elements in a given row within the array on to its heating duty cycle at the same time, for the same frequency and for the same duration.

5. The method of claim 1, wherein the frequency and duration of the heating duty cycle of the heating elements increases uniformly along the length of the heating chamber, reaching peak duration and frequency immediately prior to the pressing station, so that the temperature of the laminating film at the leading edge of the glass sheet assembly reaches bonding temperature immediately prior to the pressing station.

6. The method of claim 1, wherein differential heating along the length of the glass sheet assembly in step (b) is achieved by varying the predetermined maximum heating output of the heating elements along a length of a heating chamber in which the glass sheet assembly is heated, such that a heating element in a row closer to the leading edge of the glass sheet assembly has a higher predetermined maximum heating output than a heating element in a row closer to the trailing edge of the glass sheet assembly.

7. The method of claim 6, wherein the frequency and duration of the heating duty cycle of the heating elements is constant while the heating output increases uniformly along the length of the heating chamber, reaching a peak heating output so that the temperature of the laminating film at the leading edge of the glass sheet assembly reaches bonding temperature immediately prior to the pressing station.

8. The method of claim 2, wherein the conveying system comprises a plurality of supporting rollers to control the movement of the glass sheet assembly relative to the array of heating elements toward the pressing station.

9. The method of claim 8, wherein the speed of travel of the glass sheet assembly relative to the array of heating elements is adjustable by adjusting the speed of the supporting rollers of the conveying system.

10. The method of claim 8, wherein the plurality of supporting rollers of the conveying system are evenly spaced across the width and breadth of the oven and offset relative to the array of heating elements.

11. The method of claim 1, wherein the relative distance between the glass sheet assembly and the array of heating elements is adjustable.

12. A method of laminating glass sheets, the method comprising the steps of:
(a) providing a glass sheet assembly comprising a first glass sheet arranged in an opposing parallel configuration with respect to a second glass sheet, with a heat sensitive layer of adhesive laminating film disposed between the first glass sheet and the second glass sheet, the glass sheet assembly having a leading edge and a trailing edge and being of a fixed length and width, the laminating film having a bonding temperature at which melting of the laminating film is initiated;
(b) heating the glass sheet assembly using an array of heating elements so as to cause differential heating along the length of the glass sheet assembly such that the temperature at the leading edge of the glass sheet assembly is higher than the temperature at the trailing edge of the glass sheet assembly with uniform heating across the width of the glass sheet assembly; and
(c) pressing the first and second glass sheets toward each other to purge air or moisture from the glass sheet assembly until the first and second glass sheets adhere together via the adhesive laminating film, the step of pressing being initiated at the leading edge of the glass sheet assembly when the temperature of the laminating film at the leading edge of the glass sheet assembly reaches the bonding temperature of the laminating film
wherein the first and second glass sheets are correspondingly curved and the heating elements are coupled with the supporting rollers of a conveying system to form an assembly.

13. The method of claim 12, wherein the assembly comprises two pairs of opposed supporting rollers and a pair of opposed heating elements with one pair of opposed supporting rollers arranged at the inlet of the assembly and the other pair of opposed supporting rollers being arranged at the outlet of the assembly, the pair of opposed heating elements being arranged therebetween.

14. The method of claim 12, wherein step (c) is conducted using a pressing station, the glass sheet assembly is conveyed to the pressing station using the conveying system, and the assembly is slidably mounted on a guide rail and constrained to move along the guide rail to follow the curve of the glass sheet assembly as it moves through the heating chamber towards the pressing station.

15. The method of claim 14, wherein each guide rail is arranged across the width of a heating chamber in which the glass sheet assembly is heated.

16. The method of claim 1, wherein the heating elements are low frequency, medium frequency, or high frequency infrared emitters.

* * * * *